United States Patent
Cesaroni et al.

(10) Patent No.: US 7,022,196 B2
(45) Date of Patent: Apr. 4, 2006

(54) PROPELLANT SYSTEM FOR SOLID FUEL ROCKET

(75) Inventors: Anthony J. Cesaroni, Gormley (CA); Michael J. Dennett, Orangeville (CA); Jeroen Louwers, Waalre (NL)

(73) Assignee: Cesaroni Technology Incorporated, Gormley (CA)

( * ) Notice: Subject to any disclaimer, the term of this patent is extended or adjusted under 35 U.S.C. 154(b) by 325 days.

(21) Appl. No.: 10/044,747

(22) Filed: Jan. 10, 2002

(65) Prior Publication Data

US 2002/0157557 A1    Oct. 31, 2002

Related U.S. Application Data

(60) Provisional application No. 60/260,750, filed on Jan. 10, 2001.

(51) Int. Cl.
  *C06B 45/00*   (2006.01)
  *C06B 31/00*   (2006.01)
(52) U.S. Cl. .............. 149/2; 149/17; 149/45
(58) Field of Classification Search ............. 149/45, 149/2, 17; 102/288, 287, 284, 285, 291; 60/219, 253
See application file for complete search history.

(56) References Cited

U.S. PATENT DOCUMENTS

| | | | |
|---|---|---|---|
| 3,183,665 A | 5/1965 | Webb | |
| 3,316,718 A | 5/1967 | Webb | |
| 3,429,265 A | 2/1969 | Longwell et al. | |
| 3,522,334 A * | 7/1970 | Bieber et al. | 264/3.1 |
| 3,527,168 A | 9/1970 | McCurdy et al. | |
| 3,811,380 A | 5/1974 | Glass | |
| 3,812,671 A | 5/1974 | Burr et al. | |
| 3,995,559 A * | 12/1976 | Bice et al. | 102/100 |
| 4,781,117 A | 11/1988 | Garnett et al. | |
| 4,950,341 A * | 8/1990 | Schoyer et al. | 149/22 |
| 5,010,728 A | 4/1991 | Joy | |
| 5,351,619 A | 10/1994 | Chan et al. | |
| 5,579,635 A | 12/1996 | Miskelly, Jr. et al. | |
| 5,714,711 A | 2/1998 | Schumacher et al. | |
| 5,847,311 A | 12/1998 | Ryder | |
| 6,354,218 B1 | 3/2002 | Weise et al. | |
| 6,647,888 B1 | 11/2003 | Cesaroni et al. | |

* cited by examiner

*Primary Examiner*—Aileen Felton

(74) *Attorney, Agent, or Firm*—Alston & Bird LLP

(57) ABSTRACT

An oxidizer package for use in a solid fuel propellant system. The oxidizer package comprises a solid oxidizer in the form of discrete pellets of predetermined geometric shape. The pellets are arranged in an array with spaces amongst the pellets. A holder is provided for maintaining the pellets in the array for receipt of a binder introduced to spaces amongst the array of pellets. Preferred propellants include hydrazinium nitroformate and nitronium perchlorate. This arrangement for the pellets can achieve loadings as high as 85% by weight for the pellets.

37 Claims, 7 Drawing Sheets

PROPELLANT SYSTEM FOR SOLID FUEL ROCKET

CROSS REFERENCE TO RELATED APPLICATIONS

This application claims the benefit of U.S. Provisional Application No. 60/260,750, filed Jan. 10, 2001.

FIELD OF THE INVENTION

The present invention relates to solid propellants, and especially to solid propellant systems for rockets. In particular, the present invention relates to a propellant system having pellets of most preferably hydrazinium nitroformate and/or ammonium dinitramide, optionally including ballistic modifiers, arranged in a supporting binder matrix. The pellets are preferably arranged in a desired array. The pellets and matrix of binder have complimentary burn rates.

BACKGROUND TO THE INVENTION

The following acronyms are used in this application:

| | |
|---|---|
| AP | ammonium perchlorate |
| AN | ammonium nitrate |
| ADN | ammonium dinitramide |
| BAMO/AMMO | bis-azidomethyloxetane/azidomethyl-methoxetane copolymer |
| BAMO/NMMO | bis-azidomethyloxetane/nitramethyl-methoxetane copolymer |
| GAP | glycidyl azide polymer |
| HAN | hydroxylammonium nitrate |
| HAP | hydroxylammonium perchlorate |
| HNF | hydrazinium nitroformate |
| HTPB | hydroxyl-terminated polybutadiene |
| NP | nitronium perchlorate |
| PBAN | polybutadiene acrylonitrile |
| Poly NMMO | Polynitramethylmethoxetane |

Solid propulsion systems could provide very high specific impulse by utilizing high performance oxidizers such as ADN, HAP, HAN, HNF, NP and the like. Many of these oxidizers offer significant gains on performance, reduced or low toxicity and have desirable exhaust signature characteristics, when compared to propulsion systems using traditional solid oxidizers. However, many of these oxidizers suffer from varying degrees and forms of instability, such as photo sensitivity, shock, friction and impact sensitivity, decomposition in the presence of moisture, sensitivity to pH and incompatibility (such as hypergolic reaction) to other propellant materials. A typical example of incompatibility is reaction between HNF and curing agents used in solid propellant binder systems such as HTPB and GAP. Many difficulties have been encountered incorporating the oxidizers into propellant systems, and solutions to particular storage and stability problems often result in compromising the theoretical performance potential. For example, current techniques to synthesize HNF still produce particles with length to diameter ratios of 2:1 to 3:1 with significant variation from the mean. This seriously impacts formulation rheology and can prevent achievement of optimum solids loading, as well as aggravating friction sensitivity during mixing and casting operations.

Storing the oxidizer separately in the motor offers the ability to avoid compatibility issues between oxidizers and common solid propellant system components. Separate storage of solid and semi-solid oxidizers and expulsion systems have been proposed and demonstrated in the past. Some of the difficulties in these approaches include flow stability, concentration and distribution of oxidizer solids in carrier agents, pressurization and piping system requirements, specialized control valves and system integration.

Improvements or alternatives in solid propellant systems for rockets would be useful.

SUMMARY OF THE INVENTION

According to an aspect of the invention, there is provided, an oxidizer package for use in solid fuel propellant system, the oxidizer package comprising a solid oxidizer in the form of discrete pellets of a pre-determined geometric shape, the pellets being arranged in an array with spaces amongst the pellets and a holder for maintaining the pellets in the array for receipt of a binder introduced to spaces amongst the array of pellets.

According to another aspect of the invention, there is provided, a solid fuel propellant system comprising pellets of a solid oxidizer, the pellets having a predetermined geometric shape and being arranged in an array with spaces amongst the pellets, a binder introduced to the spaces amongst the pellets to provide a support matrix for the pellets, the binder being of a selected material to provide complementary burn rates for the pellets and the support binder matrix.

According to a further aspect of the invention, there is provided, a method of making a solid fuel propellant system for solid pellets of oxidizer having a predetermined geometrical shape, comprising:
  i) introducing a binder amongst the oxidizer pellets arranged in an array, and
  ii) allowing the binder to set to support the pellets in a binder matrix.

Accordingly, a preferred aspect of the present invention provides a solid fuel propellant system which is particularly useful as a solid rocket fuel. The propellant system comprises a solid composition of hydrazinium nitroformate or ammonium dinitramide in the form of pellets, said pellets being arranged in a matrix of a binder, said pellets and matrix of binder having complementary burn rates.

In preferred embodiments of the invention, the pellets are pressed from said composition.

In another preferred embodiment, the composition additionally contains ballistic modifiers or other additives as required.

In another preferred embodiment, the composition additionally contains ultrafine aluminum.

In further embodiments, a portion of the propellant system is separated from another portion by an inhibitor layer.

In still further embodiments, the portions are in the shape of a right section of a cylinder, especially a right cylinder divided into more than one section. The sections may be semi-circles, tri-sections or quadrants. The portions of the propellant have a circular cross-section with parallel planar opposing ends.

In further embodiments, the pellets are in the form of at least one of spheres, capsules, rods and tubes.

BRIEF DESCRIPTION OF THE DRAWINGS

The present invention is illustrated by the embodiments shown in the drawings, in which.

DETAILED DESCRIPTION OF THE INVENTION

The present invention relates to propellant systems for solid fuel rockets. In aspects of the invention, the pellets may be formed from a variety of oxidizers, including for example ammonium perchlorate (AP) and ammonium nitrate (AN). The invention is particularly suited to the use of high performance oxidizers where such oxidizers frequently exhibit incompatibilities and/or processing difficulties in conventional compositions, as is appreciated by those skilled in the art. Preferred embodiments of the present invention will be particularly described herein with respect to the use of hydroxylammonium nitrate (HAN), hydroxylammonium perchlorate (HAP), nitronium perchlorate (NP) and most preferably hydrazinium nitroformate (HNF) and ammonium dinitramide (ADN).

In the preferred embodiments of the present invention, the propellant system has pellets of oxidizer, optionally including ballistic modifiers or other additives as required, provided in a support matrix of binder. The pellets are preferably arranged in a predetermined uniform manner in the binder. Alternatively the pellets may be mixed into the binder. The pellets and matrix of binder are selected in both type and dimensions so that the pellets and binder have complementary burn rates.

In preferred embodiments, the pellets have a diameter of at least 0.5 mm and preferably at least 1 mm. As such, the pellets have greater dimensions than what would normally be considered to be individual crystals of the same compounds. In most applications, the pellet size does not usually exceed 10 mm.

Figure 1:
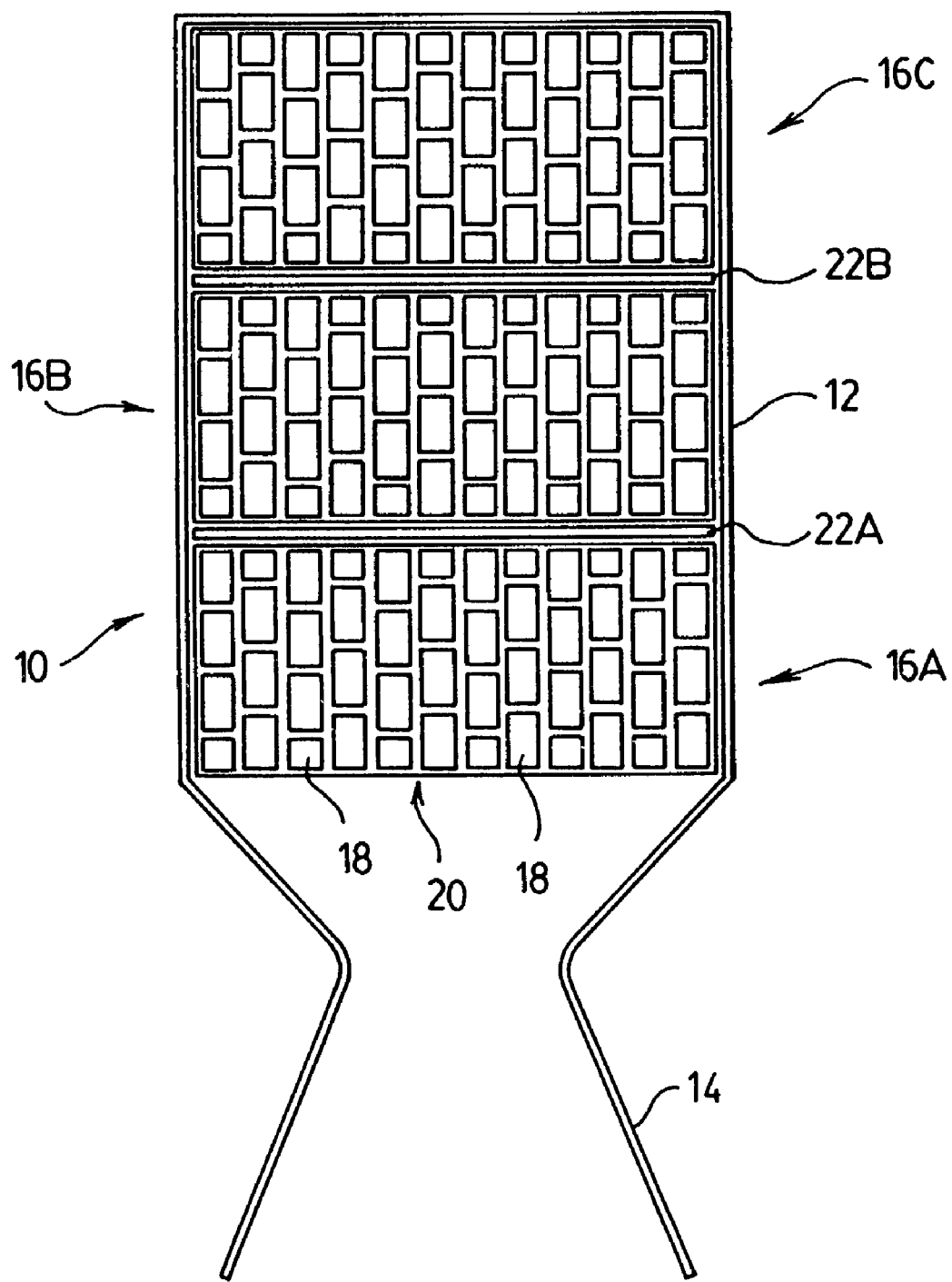
FIG. 1 is a schematic representation of a cross-section of a solid fuel rocket.

FIG. 1 shows a vertical cross-section of a fuel section of a solid fuel rocket, with the fuel section being generally indicated by 10. Fuel section 10 has fuel casing 12 and nozzle section 14. It is understood, that fuel section 10, including fuel casing 12 and nozzle section 14, would normally be enclosed within an outer structure of a solid fuel rocket. For example, the solid fuel rocket would normally include a cone, as will be appreciated.

Fuel casing 12 has fuel blocks 16A, 16B and 16C. Although three fuel blocks 16 are shown, it is understood that the rocket could have fewer or, in particular, more of such fuel blocks. The number and size of the fuel blocks will depend on the intended end-use of the rocket. Each of fuel blocks 16A, 16B and 16C has a plurality of pellets 18 surrounded by a support matrix of binder 20. In the embodiment shown in FIG. 1, pellets 18 are aligned in a vertical direction. It is understood, however, that pellets 18 may be aligned in an off-set arrangement, as is illustrated in FIG. 2B.

Fuel blocks 16A and 16B are separated by inhibitor layer 22A. Similarly, fuel blocks 16B and 16C are separated by inhibitor layer 22B. It is understood that the inhibitor layers are intended to block ignition of fuel block 16A from being propagated into fuel block 16B during firing of the rocket, unless it is intended that that occur.

Each of fuel block 16A, 16B and 16C would have ignition systems for the firing of the fuel blocks at an appropriate timing.

In operation, fuel block 16A would undergo ignition, using an ignition system (not shown). The ignition system would normally be centrally located with respect to nozzle section 14, although alternate configurations are shown in FIGS. 4A–4F. As discussed herein, the burn rate for pellets 18 should be complementary with the burn rate for matrix 20, although the burn rate of the composition of the pellet per se and of the composition of the matrix per se may be substantially different. In particular, the respective burn rates should be such that pellets 18 are not consumed substantially faster than matrix 20, and conversely that matrix 20 is not consumed substantially faster than pellets 18. The effective burn rates may be controlled by selection of the materials for the matrix and the pellets, and by selection of the thickness of the matrix between pellets in both a horizontal and a vertical direction.

The rocket may be launched by ignition of only fuel block 16A, or by the ignition of any sequential combination of fuel blocks. For instance, if only fuel block 16A is used in the launch of the rocket, then fuel block 16B could be ignited at a subsequent stage in the flight of the rocket. If there are only three fuel blocks, as illustrated, fuel block 16C could be ignited in any final stage of the flight of the rocket. Appropriate inhibitor layers 22 and ignition systems for each fuel block would be used within the rocket. While it is not possible to start and stop the burning of any particular fuel block, the use of multiple fuel blocks and inhibitor layers within the rocket permits flexibility and control in firing of the rocket and in the flight of the rocket.

Figure 2A:
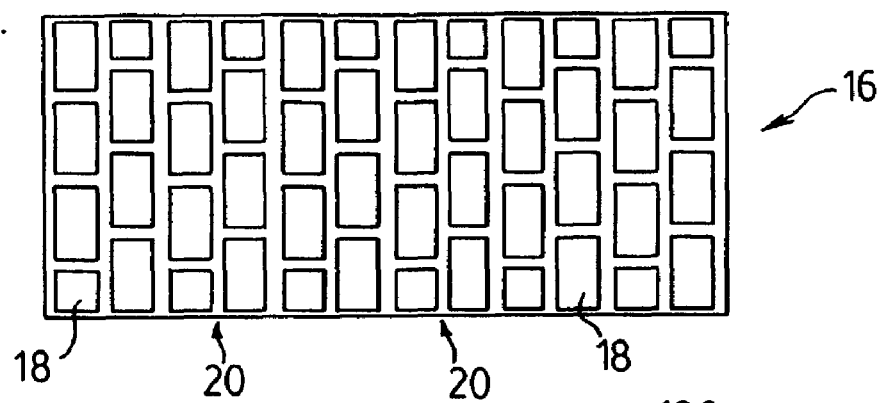
FIGS. 2A, 2B, 2C and 2D are schematic sectional representation of embodiments of the fuel blocks of a solid fuel rocket of FIG. 1.
Figure 2B:
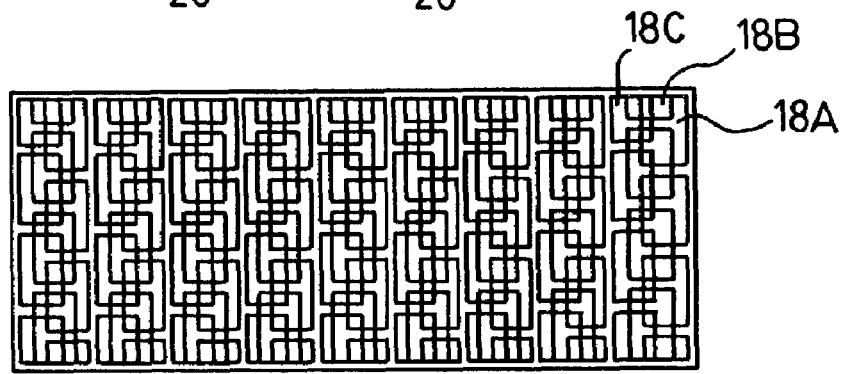

FIG. 2A shows a vertical cross-section of a fuel block 16 as shown in FIG. 1. In FIG. 2A, only a single layer of pellets 18 and matrix 20 is shown.

FIG. 2B shows a similar cross-section to that shown in FIG. 2A, except that in FIG. 2B the cross-section shows underlying layers of pellets. In each instance, pellets 18 are aligned in a vertical direction. However, in the embodiment shown, the underlying layers of pellets 18 are shown as being off-set in a horizontal direction. In particular, the column of pellets 18A is off-set from the column of pellets 18B, which in turn is off-set from the column of pellets 18C. In addition, pellets 18A, 18B and 18C are off-set in a vertical direction, in that in the embodiment illustrated the bottom section of pellets 18A is not aligned with the corresponding bottom section of pellets 18B and 18C.

Figure 2C:
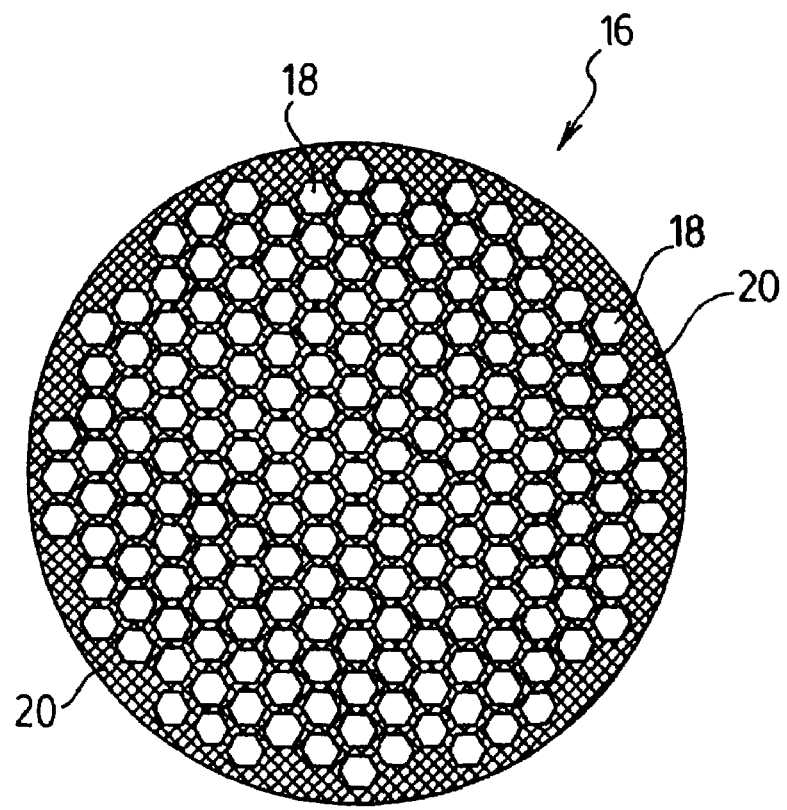

FIG. 2C shows a horizontal cross-section of a fuel block 16. In FIG. 2C, fuel block 16 is shown as having a plurality of pellets 18, which are of a hexagonal cross-section. Pellets 18 are separated by matrix 20, but are aligned vertically in a close-packed arrangement as determined by the hexagonal cross-sectional shape of pellets 18.

It is understood that the pellets may have a variety of predetermined geometrical shapes such as different cross-sectional shapes including square, rectangular, hexagonal, polygonal or circular in cross-section. Thus, in embodiments, the pellets are in the form of a cylinder. Moreover, as illustrated below, the pellets may be in the form of spheres or similar geometrical shapes.

Figure 2D:
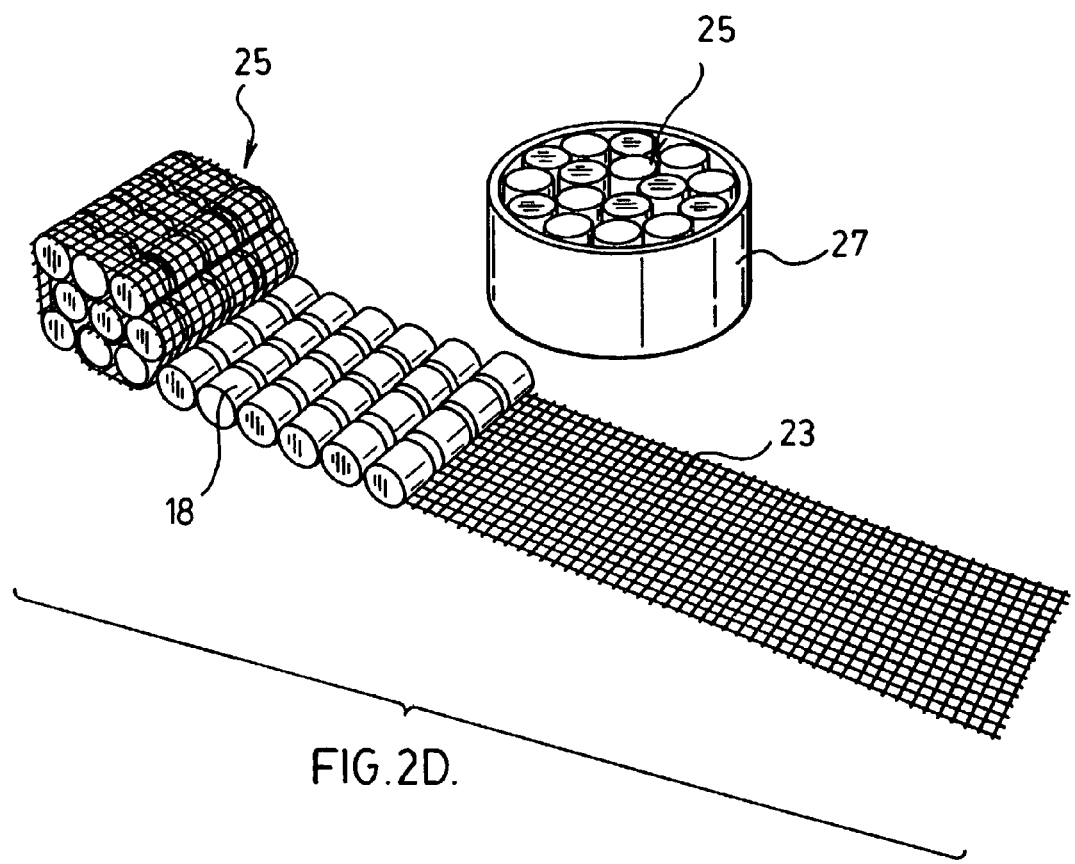

FIG. 2D shows an alternative embodiment for assembling an array of pellets 18. An open mesh 23 has rows of pellets 18 assembled thereon. The mesh 23 carries an adhesive at least on the side in contact with the pellets. The assembled rows of pellets on the web 23 may be rolled up into a bundle 25. The adhesive on the mesh holds the pellets in the desired array in the bundle 25. The resultant somewhat circular shaped bundle 25 may be then placed in a section of tube or annular cavity 27. If the mesh has adhesive on both sides, the mesh has the ability to hold the bundle shape until placed in a container. A binder may be then introduced to the bundle 25 to flow into the spaces amongst the pellets to provide a supporting matrix for the pellets when the binder has set.

Figure 3:
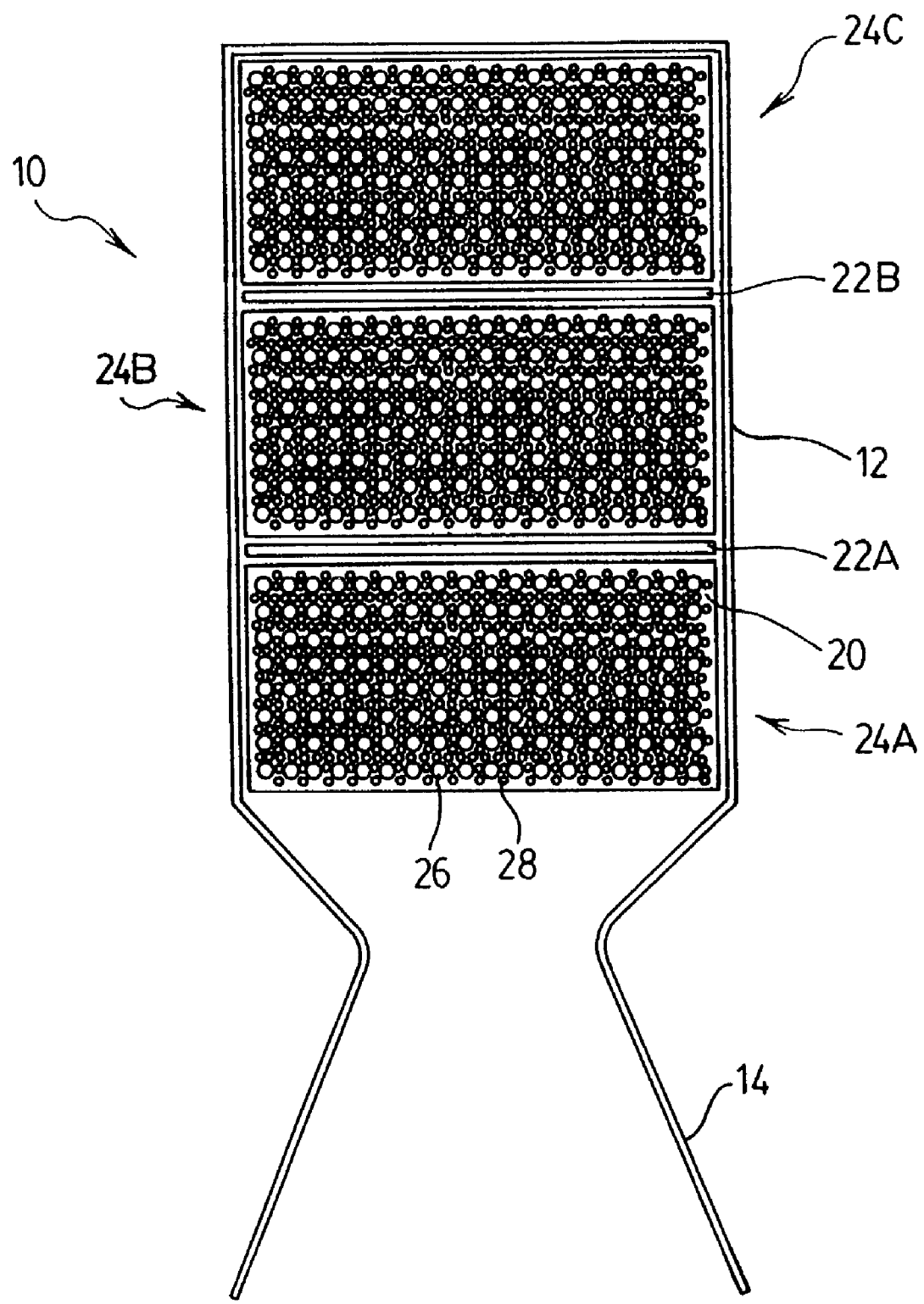
FIG. 3 is a schematic representation of an alternate embodiment of a solid fuel rocket.

FIG. 3 shows an alternate embodiment of a fuel section of a solid fuel rocket. Fuel section 10 is of a similar construction to that shown in FIG. 1, but in FIG. 3, fuel blocks 24 differ from the fuel blocks 16 of FIG. 1. Fuel blocks 24 are formed from spheres 26 and 28 in matrix 20. Spheres 26 and 28 are of different diameters, and are a different shaped form of pellet 18. Spheres 26 and 28, being of different sizes, allow for a high density packing of the fuel of the pellet.

In respect of the various embodiments discussed in regards to FIGS. 1, 2 and 3, it is apparent that the pellets may be of various predetermined geometrical shapes and can be loaded into an appropriate tube or annular-shaped container to define a desired array of pellets. This array of pellets will inherently have spaces amongst the pellets because by virtue of their pre-selected shape, spaces will be developed amongst the pellets even though surfaces of the pellets may be in contact. Preferably a holder of some type is used to maintain the pellets in their desired array. The holder may be a tube into which the pellets are manually placed and configured in the desired array before the introduction of the binder. Alternatively, the pellets could be dumped into a tube and simply by their random stacking develop spaces amongst the pellets ready to receive the binder. Another alternative is to provide a strip holder such as the open mesh of FIG. 2D having an adhesive on at least one surface. The adhesive holds the rows of pellets as set up on the open mesh. When the open mesh is rolled a bundle of pellets is defined where again open spaces exists amongst the pellets. Arranging the pellets into a predetermined array can be considered a novel type of bundle or package for the oxidizer and as such this constitutes a unique composition of matter for rocket propulsion systems.

The spaces amongst the pellets are shown clearly, for example, in FIG. 1 where the binder 20 is indicated and in FIGS. 2A and 2C where the binder 20 is indicated. When the binder is set, this predetermined array for the pellets is maintained to ensure proper ignition and combustion patterns as the array of materials is consumed after ignition.

In some embodiments of the invention, for example, in FIG. 3 the spaces amongst the pellets are at a minimum. The ideal ratio of binder to pellets expressed by weight is about 85% pellets to 15% binder. With prior art systems this ratio was unachievable with individual crystals of certain high performance oxidizers. Some packing arrangements using very small crystals of oxidizer which is mixed with the binder achieved loading of about 80% propellant to 20% binder.

In accordance with this invention, by choosing a predetermined geometric shape and hand-packing the pellets into a holder for the array loadings of 85% by weight of pellet to 15% by weight of binder is achievable and in the past never thought possible. To achieve these loadings with very active oxidizers such as hydrazinium nitroformate, ammonium dinitramide is quite surprising and provides significant efficiencies compared to prior art systems.

With some of the packing arrangements, particularly where the spaces amongst the pellets are minimal, injection of the binder into the array is preferred. Such injection takes place in a manner that does not disrupt the array to ensure proper burning characteristics of the fuel and oxidizer. The pellets and holder have the binder introduced thereto under a vacuum. The vacuum evacuates any gases around the bundle and assists in the binder permeating and setting up in all spaces amongst the pellets.

According to another embodiment, very high loadings of the pellets and the binder can be achieved simply by mixing the pellets into the binder. This can be done by loading the binder and pellets into a mixer where a thorough mixing of the pellets and the binder takes place to provide a somewhat uniform distribution of the pellets and the binder at weight ratios well in excess of 80% pellets to 20% binder. The mixing is carried out in a vacuum to eliminate entrained gases, to ensure thorough covering of the pellets with the binder and to achieve fairly even distribution of the pellets through the binder so that predictable ignition and combustion patterns occur. The binder is then allowed to set and thereby freeze the array of pellets in the binder.

The spacing between the pellets is normally less than 50 microns but in any case is determined by the volumetric ratios of the materials being mixed and the particle size of any other solid materials included in the binding material filling the interstices between oxidzer pellets. It is understood that the volumetric ratios of the various materials would be controlled in a manner designed to prevent undue settling and thus uneven distribution of the pellets within the binder matrix. These techniques are known to those skilled in the art.

The pellets are most preferably formed from hydrazinium nitroformate (HNF) or ammonium dinitramide (ADN), or mixtures thereof, by "dead pressing" such compounds to form the pellets. For instance, the pellets may be formed by pressing the compounds at pressures in excess of 200 MPa. HNF or ADN may be used as such, or in admixture. In preferred embodiments, the HNF or ADN is pressed to at least 90% of the theoretical maximum density of the compounds, especially at least 93% of theoretical maximum density (TMD). TMD is known in the industry, and refers to the density of the material in pure solid form with zero voids. At such pressures, individual crystals of HNF tend to effectively form a single crystal with small voids.

In other embodiments of the present invention, the HNF or ADN is blended with aluminum, and most especially with ultra-fine aluminum. Such aluminum has a particle size of about 1 micron or less. The amount of aluminum may be varied over a wide range, from 0% up to about 40%, and most especially in the range of 10–30% by weight. Other metal or non-metal fuel additives may also be used as appropriate.

The compositions used to form the pellets may also contain modifiers. Such modifiers are known and used in solid propellant systems. Examples of modifiers would be ballistic modifiers such as ferrocene or ferrocene derivatives, borohydrides, copper chromite, oxamide, oxides or fluorides of iron, chromium, copper, lithium, magnesium, and others; thermally-conductive burn rate modifiers such as silver wire or graphite whiskers; coupling agents/rheology modifiers such as titanates, zirconates, aluminates; bonding agents; opacifiers, stabilizers, metal de-activators, anti-oxidants, or other agents known to those skilled in the art to modify processing, performance, mechanical properties, storage stability, munitions sensitivity, or shelf life.

A variety of materials may be used as the binder which forms the matrix surrounding the pellets. Binder systems and processing techniques therefor are known for solid propellant compositions, and such systems are applicable to this invention, as are any others that may be selected or required by compatibility, performance, or structural issues. For instance, the binder may be a thermoplastic polymer or thermoset polymer including a hydrocarbon polymer, a fluoropolymer or a fluoroelastomer, waxes or greases of hydrocarbon or fluorocarbon basis, an energetic polymer or a polymerized peroxide. Examples of such binding materials are thermoset polymers such as HTPB, PBAN, epoxies and others, thermoplastic polymers such as ethylene/vinyl acetate co-polymer, or energetic polymers such as GAP, BAMO/AMMO, BAMO/NMMO or poly NMMO. In particular, the binder may be hydroxyl-terminated polybutadiene (HTPB). Other examples include a double-based propellant.

The binder may be a binder per se, especially if it is an energetic binder. However, the binder may also be a propellant or gas generator composition, either of which consists essentially of a binder plus an oxidizing material plus optional modifiers known to those skilled in the art. The binder may also be a double-base propellant. Thus, the solid composition, including binder, could be selected for a number of purposes e.g. (a) a gas generator, which is typically oxygen deficient, (b) a propellant, which is typically at or near stoichiometric balance between fuel and oxygen, or (c) an oxygen generator with an excess of free oxidizing species, for example for solid phase hybrid rockets or reverse hybrids e.g. solid oxidizer/liquid fuel. It is understood that the oxygen balance is determined on the overall composition, not the binder or oxidizer composition per se.

The fuel blocks may have shapes or configurations other than that shown in FIG. 2C. Such shapes include various positions of ignition systems and/or use of concentric sections, pie or other shapes. Each shape would normally have a separate ignition system. Alternatively, the fuel blocks could have multiple ignition systems. Examples of such fuel blocks are illustrated in FIGS. 4A–4F.

For convenience in assembly of the rocket, the fuel blocks may be packaged. If separate packages are used in control of the rocket, the packaging material could include an insulating layer.

FIG. 4 shows six examples of cross-sections of fuels blocks, some of which also show examples of burn patterns. It is understood that other examples of fuel blocks and burn patterns could be used.

Figure 4A:
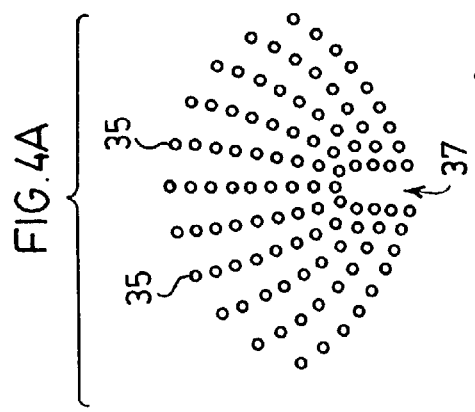
FIG. 4 shows schematic representations of cross-sections of alternate fuel blocks.

FIG. 4A shows a plurality of pellets 35 arrayed in a pattern extending from a source of ignition 37 of the fuel blocks.

Figure 4B:
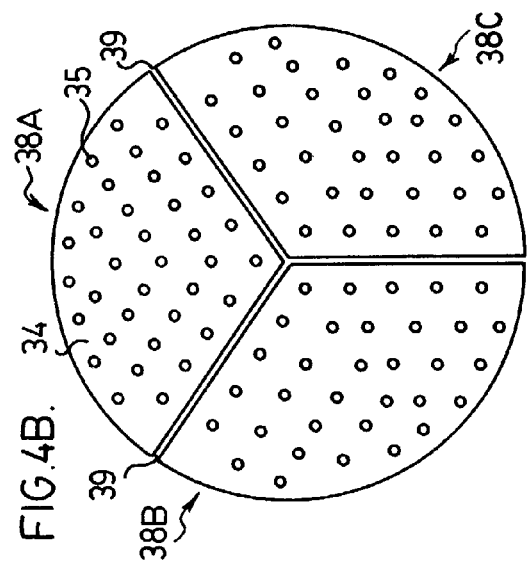

FIG. 4B shows cylindrical fuel blocks having three sections 38A, 38B and 38C, each with matrix 34 and pellets 35. Sections 38A, 38B and 38C are separated by inhibitor material 39. Inhibitor material 39 is intended to permit ignition of one section of the fuel blocks e.g. section 38A, while preventing ignition of adjacent sections 38B and 38C. In this manner, ignition of pellets may be carried out in a controlled manner, with ignition of one, or of all of sections 38A, 38B and 38C at any one time.

Figure 4C:
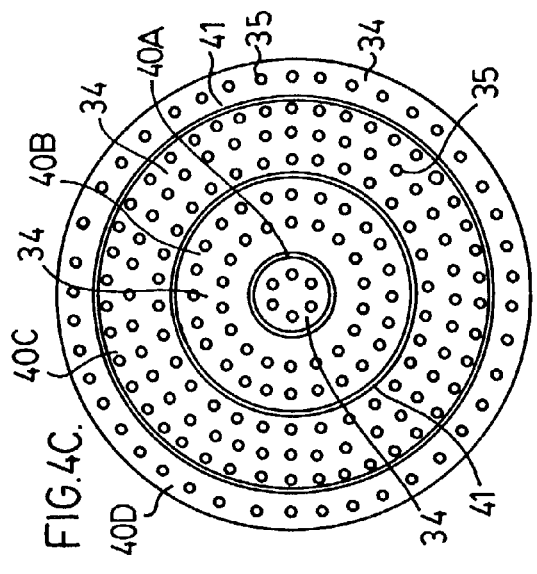

FIG. 4C shows a different array of sections. Sections 40A, 40B, 40C and 40D are in concentric circles, each with matrix 34 and pellets 35. Sections 40A, 40B, 40C and 40D are separated by inhibitor material 41. One or more of sections 40A, 40B, 40C and 40D could be ignited at any one time, and it would be normal to do so from the centre of the section.

Figure 4D:
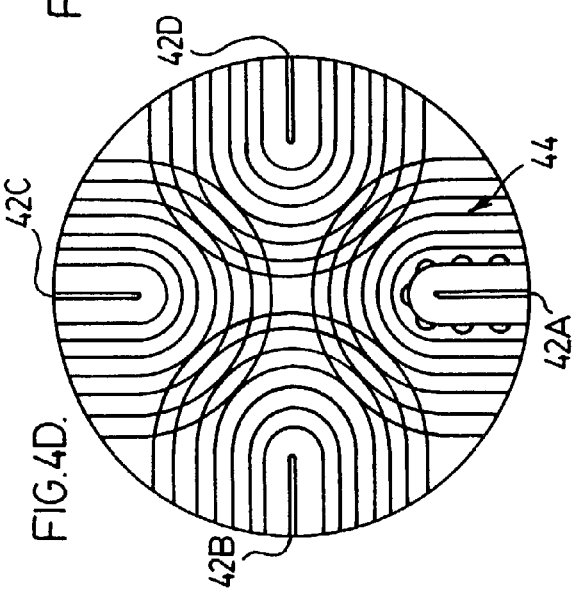

FIG. 4D shows the embodiment with burn patterns 44 if ignition is simultaneously made at each of the points of ignition 42A, 42B, 42C, and 42D.

Figure 4E:
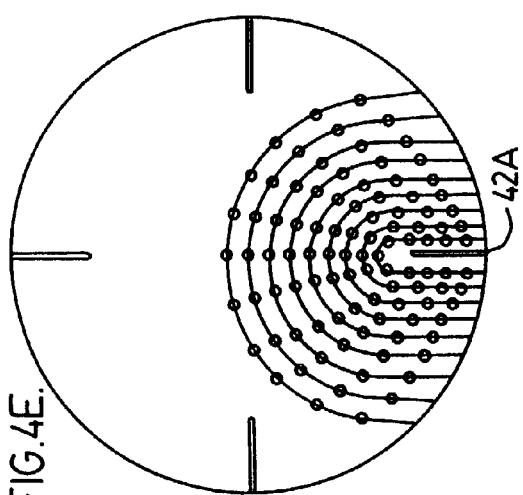

FIG. 4E shows a burn pattern from a single ignition, at 42A.

Figure 4F:
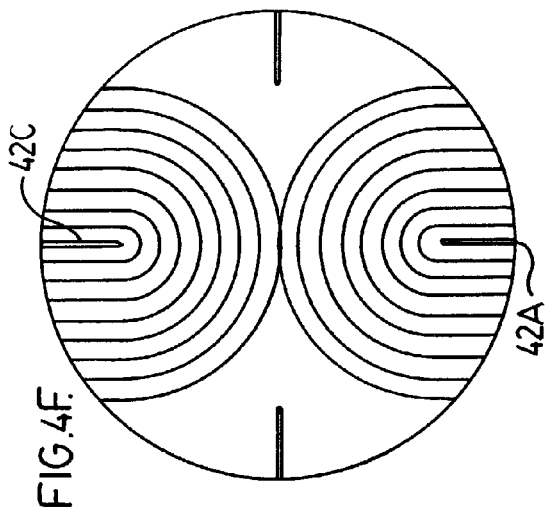

FIG. 4F shows the burn pattern if ignition is at opposed points of ignition 42A and 42C.

Figure 6:
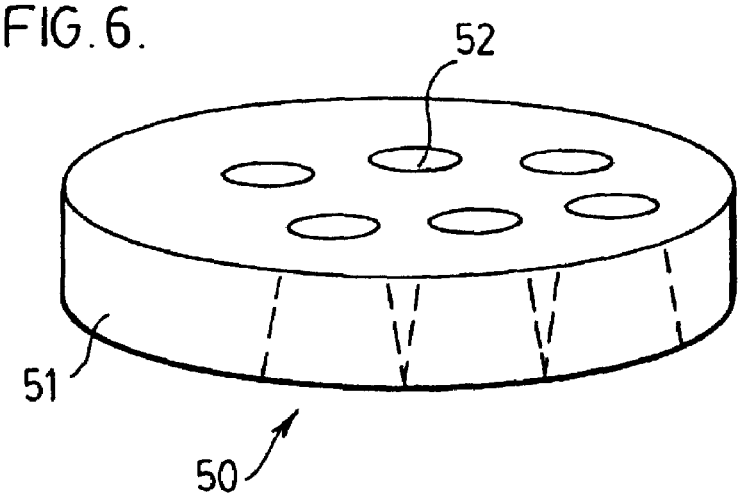
FIG. 6 is a schematic representation of an inhibitor layer.

Thus, it is to be understood that the fuel sections could be partitioned e.g. into semi-circular sections, tri-sections and quadrants. Any convenient number of sections could be used. Each section may be initiated separately or in any combination or sequence. In addition, more than one initiator may be used e.g. 2–4 initiators, as illustrated in FIG. 6.

Figure 5:
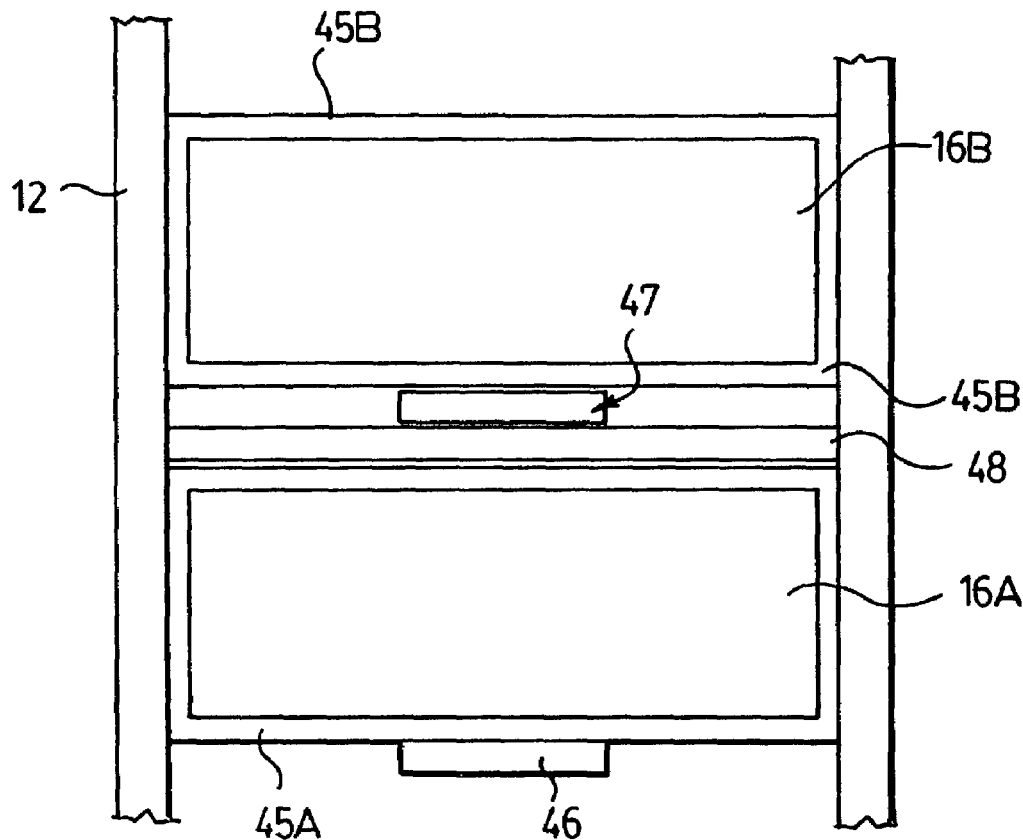
FIG. 5 is a schematic representation of a cross-section of the fuel block section of a solid fuel rocket.

FIG. 5 shows a side view in section of fuel casing 12 having fuel sections therein. Fuel casing 12 has fuel sections 16A and 16B, with other fuel sections not shown. Fuel section 16A has initiator 46 associated therewith, as well as wrapping/sealing material 45A. It is understood that the fuel section could have initiator 46 within the sealed package or separate therefrom. If separate, it is understood that the initiator would need to perforate the wrapping or sealing material so as to initiate the fuel.

Fuel section 16A is located above fuel section 16A and has initiator 47 associated therewith. Fuel section 16B is sealed by material 45B. Fuel section 16B is separated from fuel section 16B by inhibitor 48. Inhibitor 48 is intended to prevent the ignition of oxidizer package 16B by the combustion of fuel section 16A in an uncontrolled manner. It is intended that fuel section 16B would be ignited by initiator 47 at the appropriate timing.

It is understood that initiators 46 and 47 would have the appropriate electrical wiring, optical coupling, pyrotechnic coupling and timing, or other means to permit ignition of the respective oxidizer packages in the required sequence.

FIG. 6 shows one example of an inhibitor, shown as disc 50. Disc 50 would be formed of ceramic 51 or of any other suitable material that would not burn under conditions of use although it may ablate or char. Disc 50 has a plurality of holes 52, which would preferably be tapered holes with the larger dimension on the underside of disc 50. In this way, when the fuel section above disc 50 is initiated, plugging material in holes 52 would be forced downwards thereby permitting gases to pass through disc 50. However, combustion of the fuel section beneath disc 50 would not result in the material in holes 52 from being pushed upwards.

Figure 7:
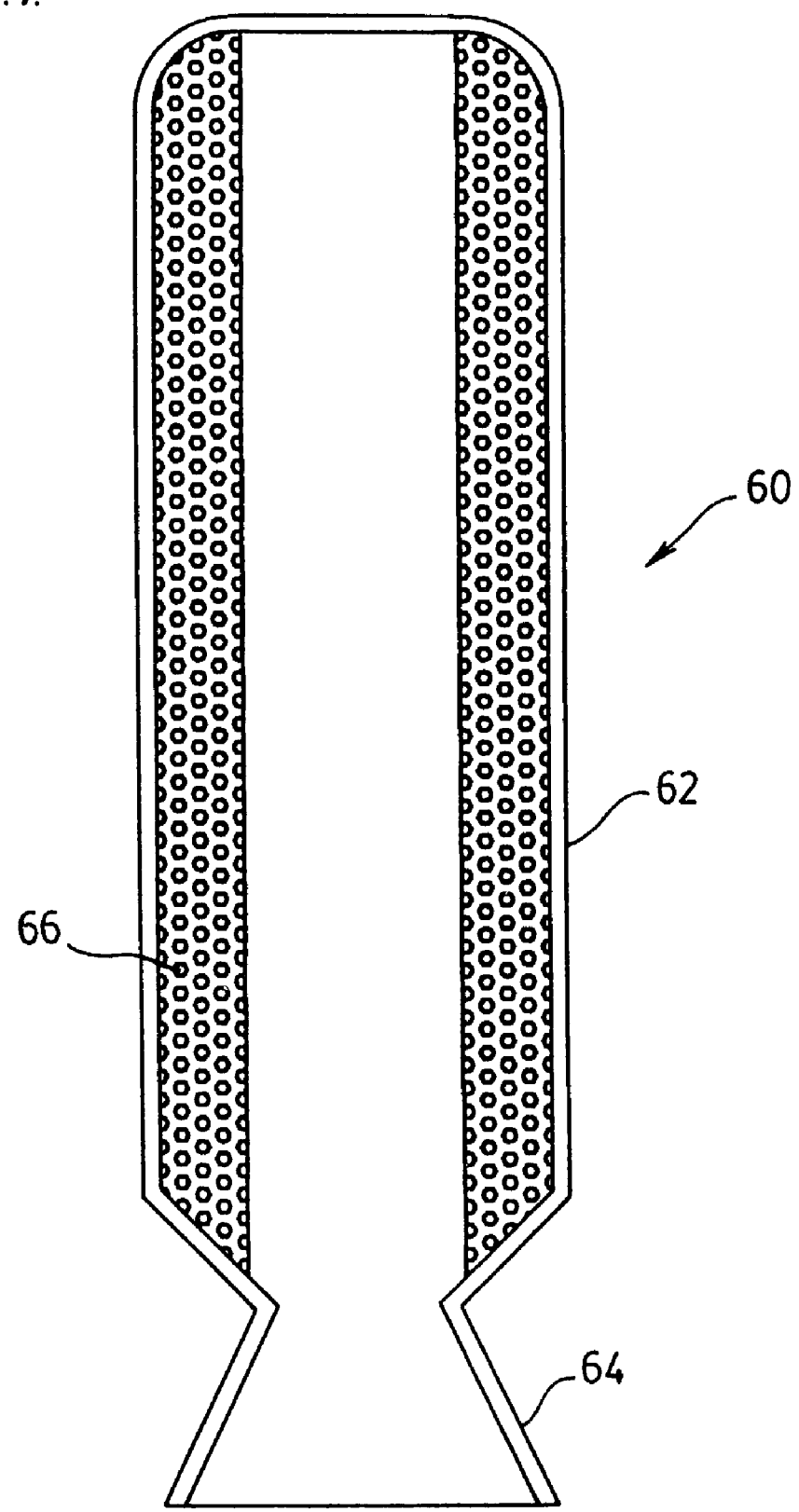
FIG. 7 is a schematic representation of an alternate solid fuel rocket.

The present invention is also applicable to a conventional solid rocket motor, for example as illustrated in FIG. 7 as 60. Rocket motor 60 has casing 62 and nozzle 64. Casing 62 contains an annular column 66 of solid rocket fuel as described herein. In particular, annular column 66 is formed of pellets of oxidizer, especially hydrazinium nitroformate or ammonium dinitramide, in a matrix of binder. The various additives described herein may also be used.

Examples of thermoplastic polymer propellant compositions and especially binders for such compositions are described in greater detail in Canadian Patent Application No. 2,243,245, published Jul. 15, 1998. For example, the binder could be polyethylene/vinyl acetate (EVA) or similar polymer, optionally cross-linked.

The present invention provides a propellant system for a solid fuel rocket with the ability to provide controlled ignition of the fuel. In preferred embodiments, the present invention provides a propellant system utilizing pellets of high-performance or conventional oxidizers with optional additives, dispersed in a matrix of binding material. The binder may be only binder, or binder plus modifiers and fuel additives such as metal, or a gas generator or propellant composition containing its own oxidizer with the appropriate additives known in the trade for particular applications. Such a propellant system provides a means of utilizing otherwise incompatible materials in more conventional solid fuel rockets, to improve performance, or achieve other goals e.g. excess oxygen for hybrid or other systems.

Although preferred embodiments of the invention have been described herein in detail, it will be understood by those skilled in the art that variations may be made thereto without departing from the spirit of the invention or the scope of the appended claims.

The invention claimed is:

1. An oxidizer package for use in solid fuel propellant system, said oxidizer package comprising a solid oxidizer in the form of discrete pellets of a predetermined geometric shape, wherein said pellets are arranged in an away with spaces amongst said pellets and said spaces are filled with a binder, said pellets having a burn rate such that said pellets are not consumed substantially faster than said binder and conversely, said binder having a burn rate such that said binder is not consumed substantially faster than said pellets.

2. An oxidizer package of claim 1 wherein said pellets are pressed from an oxidizer composition.

3. An oxidizer package of claim 1 wherein said oxidizer composition comprises an oxidizer selected from the group consisting of hydroxylammonium nitrate, ammonium perchlorate, ammonium nitrate, hydroxylammonium perchlorate, nitronium perchlorate, hydrazinium nitroformate and ammonium dinitramide.

4. An oxidizer package of claim 3 wherein the composition additionally comprises at least one of modifiers and fuel additives.

5. A solid fuel propellant system comprising at least one oxidizer package of claim 1.

6. A solid fuel propellant system of claim 5, wherein said pellets are pressed from an oxidizer composition.

7. A solid fuel propellant system of claim 6, wherein said oxidizer composition comprises an oxidizer selected from the group consisting of hydroxylammonium nitrate, ammonium perchlorate, ammonium nitrate, hydroxylammonium perchlorate, nitronium perchlorate, hydrazinium nitroformate and ammonium dinitramide.

8. A solid fuel propellant system of claim 7, wherein the composition additionally comprises at least one of modifiers and fuel additives.

9. A solid fuel propellant system of claim 6, wherein said composition contains ultrafine aluminum.

10. A solid fuel propellant system of claim 5, wherein the propellant system comprises at least two oxidizer packages, one oxidizer package being separated from another oxidizer package by an inhibitor layer.

11. A solid fuel propellant system of claim 10, wherein at least two oxidizer packages are in the shape of a right section of a cylinder.

12. A solid fuel propellant system of claim 11 wherein said right cylinder is divided into more than one section.

13. A solid fuel propellant system of claim 12 wherein said sections are selected from semi-circles, tri-sections and quadrants.

14. A solid fuel propellant system of claim 12 wherein said at least two oxidizer packages of the propellant have a circular cross-section with parallel planar opposing ends.

15. A solid fuel propellant system of claim 5 wherein the pellets are in the form of at least one of spheres, capsules, rods and tubes.

16. A solid fuel propellant system of claim 5 wherein the binder is selected from the group consisting of a thermoplastic polymer, a thermoset polymer, waxes or greases, an energetic polymer and a polymerized peroxide.

17. A solid fuel propellant system, of claim 5 wherein the binder is a composite propellant or gas generator composition, or a double-base propellant.

18. A solid fuel propellant system of claim 7, wherein said oxidizer is hydrazinium nitroformate.

19. A solid fuel propellant system of claim 7, wherein said oxidizer is ammonium dinitramide.

20. A solid fuel propellant system of claim 5, wherein said propellant system is for a rocket.

21. A method of making a solid fuel propellant system of claim 5, comprising:
  i) introducing the binder amongst said pellets arranged in said array, and
  ii) allowing said binder to set to support said pellets in a binder matrix.

22. A method of claim 21 comprising the additional step of arranging said pellets in an array of predetermined arrangement.

23. A method of claim 21 wherein said binder is poured onto said array of pellets and is allowed to flow into spaces amongst said array of pellets.

24. A method of claim 21 wherein said binder is injected into spaces amongst said array of pellets.

25. A method of claim 21 wherein said pellets are mixed into said binder to provide thereby a random array of pellets in said binder.

26. A method of claim 25 wherein a sufficient amount of pellets are mixed with said binder to provide an array spacing between pellets of less than about 50 microns.

27. An oxidizer package of claim 1 wherein the pellets are in the form of at least one of spheres, capsules, rods and tubes.

28. An oxidizer package of claim 1 wherein the binder is selected from the group consisting of a thermoplastic polymer, a thermoset polymer, waxes or greases, an energetic polymer and a polymerized peroxide.

29. An oxidizer package of claim 1 wherein the binder is a composite propellant or gas generator composition, or a double-base propellant.

30. A solid fuel propellant system of claim 5, wherein the binder provides a support binder matrix, the binder being of a selected material to provide complementary burn rates for said pellets and said support binder matrix.

31. An oxidizer package of claim 1 further comprising a holder for maintaining said pellets in said array for receipt of said binder.

32. An oxidizer package of claim 31 wherein said holder for said array of pellets is a container.

33. An oxidizer package for use in solid fuel propellant system, said oxidizer package comprising a solid oxidizer in the form of discrete pellets of a predetermined geometric shape, said pellets being arranged in an array with spaces amongst said pellets and said spaces are filled with a binder, and further comprising a holder for maintaining said pellets in said array for receipt of said binder, wherein said holder is a flexible open mesh having at least one adhesive surface for sticking to said pellets, said mesh being wrapped about said pellets to hold said pellets in said array until said binder is introduced to said spaces amongst said pellets through said open mesh.

34. An oxidizer package of claim 31 wherein said holder for said array of pellets is a flexible open mesh having adhesive surfaces for sticking to said pellets, said mesh being wrapped about said pellets to hold said pellets in said array until said binder is introduced to said spaces amongst said pellets through said open mesh.

35. An oxidizer package of claim 1 wherein the burn rates of said pellets and said binder is controlled by selection of the materials for said pellets and said binder and by selection of the thickness of said binder between said pellets in both a horizontal and vertical direction.

36. An oxidizer package of claim 1 wherein a ratio of said pellets to said binder is at least about 80% by weight of said pellets to at most about 15% by weight of said binder.

37. An oxidizer package of claim 36 wherein said ratio is about 85% by weight of said pellets and about 15% by weight of said binder.

* * * * *

UNITED STATES PATENT AND TRADEMARK OFFICE
CERTIFICATE OF CORRECTION

| | | |
|---|---|---|
| PATENT NO. | : 7,022,196 B2 | Page 1 of 1 |
| APPLICATION NO. | : 10/044747 | |
| DATED | : April 4, 2006 | |
| INVENTOR(S) | : Cesaroni et al. | |

It is certified that error appears in the above-identified patent and that said Letters Patent is hereby corrected as shown below:

<u>Column 9</u>,
Line 13, "away" should read --array--.

Signed and Sealed this

Eighth Day of August, 2006

JON W. DUDAS
*Director of the United States Patent and Trademark Office*